(12) United States Patent
Lee et al.

(10) Patent No.: US 6,718,827 B1
(45) Date of Patent: Apr. 13, 2004

(54) CENTER-MOUNT CAPACITIVE SENSOR WITH OVERLOAD PROTECTION

(75) Inventors: Shih-Ying Lee, Lincoln, MA (US); Gino A. Pinto, Milford, MA (US); Thomas Foley, Maynard, MA (US)

(73) Assignee: Setray Systems, Inc., Boxboro, MA (US)

( * ) Notice: Subject to any disclaimer, the term of this patent is extended or adjusted under 35 U.S.C. 154(b) by 0 days.

(21) Appl. No.: 10/298,102

(22) Filed: Nov. 15, 2002

(51) Int. Cl.$^7$ ............................. G01L 9/12; G01L 19/04
(52) U.S. Cl. ............................................ 73/718; 73/709
(58) Field of Search ........................ 73/718, 724, 709; 361/281.3

(56) References Cited

U.S. PATENT DOCUMENTS

| | | | |
|---|---|---|---|
| 4,358,814 A | * 11/1982 | Lee et al. | ................ 361/283.4 |
| 4,519,256 A | * 5/1985 | Daniels | ........................ 73/745 |
| 4,773,269 A | * 9/1988 | Knecht et al. | ................ 73/706 |

* cited by examiner

*Primary Examiner*—William Oen
(74) *Attorney, Agent, or Firm*—McDermott, Will & Emery

(57) ABSTRACT

A capacitive sensor includes an elastic member extending about a central axis, having a central region, a peripheral region, a first side, and a second side. An overpressure stop member has an inner surface and an outer surface. The inner surface of the overpressure stop member has a contour adapted to limit deflection of the elastic member caused by a differential pressure between the two regions across the elastic member. The outer surface of the overpressure stop member has an first electrically conductive region. A second plate is spaced apart from the outer surface of the overpressure stop member, and being connected to the central region of the elastic member by a post, wherein the post transfers deformation of the elastic member caused by differential pressure across the elastic member to movement of the second plate along the central axis. The second plate has a second electrically conductive region opposite the first electrically conductive region, wherein the first electrically conductive region and the second electrically conductive region form a capacitor.

41 Claims, 5 Drawing Sheets

CENTER-MOUNT CAPACITIVE SENSOR WITH OVERLOAD PROTECTION

FIELD OF THE INVENTION

This invention relates to a capacitive sensor and more particularly, a center-mount capacitive sensor which has an overload protection mechanism.

BACKGROUND OF THE INVENTION

Capacitance sensors are well known in the prior art. In some forms, capacitive sensors include a fixed element having a rigid, planar electrically conductive surface forming one plate of a substantially parallel plate capacitor. A deformable electrically conductive elastic member, such as a machined metal or metal foil diaphragm, forms the other plate of the capacitor. Generally, the diaphragm is edge-supported so that a central portion is substantially parallel to and opposite the fixed plate. In other forms, capacitive sensors are constructed with their capacitance plates connected at their centers. The electrically conductive surfaces forming the capacitor are insulated from the central connection and each other. Since the sensor has the form of a parallel plate capacitor, the characteristic capacitance of the sensor is inversely proportional to the gap, d, between central portion of the diaphragm and the conductive surface of the fixed element. In the case of a capacitive sensor for pressure, in order for there to permit a pressure differential across the diaphragm, the region on one side of the diaphragm is sealed from the region on the opposite side. Such capacitive sensor are also useful for sensing force, such as may be applied against the diaphragm relative to the support for the diaphragm edge.

For such sensors, the elasticity of the edge supported elastic member is selected so that pressure (or force) differentials across the elastic member in a particular range of interest, cause displacements of its central portion. These pressure differential-induced displacements result in corresponding variations in the gap, d, between the two capacitor plates, and thus in capacitance variations produced by the sensor. For relatively high sensitivity, such sensors require large changes of capacitance in response to relatively small gap changes. To achieve such sensitivity from unit to unit, nominal gap dimensions generally require that their component parts be manufactured to very close tolerances to establish the required dimensional relationships. In addition, the structure and materials must maintain those relationships over a useful temperature range.

One type of prior art sensor is disclosed in U.S. Pat. No. 3,859,575, assigned to the assignee of the subject invention. That prior art sensor, exemplified by the Model 209 transducer and transmitter, manufactured by Setra Systems, Inc., includes a tubular shaped member, an edge supported elastic member having a conductive portion, a flat electrode member with a central support means, a periphery conductive means, and an insulative means disposed between and connecting the periphery conductive means and the central support means. The elastic member is connected to the tubular member at its periphery. The flat electrode member is supported by a central stud passing through the elastic member and the central support means of the electrode member. A plane spacing washer is disposed between and separates the flat electrode and the elastic member by a precise distance. The periphery conductive means of the electrode member has a conductive surface opposite the conductive portion of the elastic member. Thus, a capacitor is formed by the elastic member and the flat electrode member. When force is applied to the elastic member, the distance between the conductive portion of the elastic member and the periphery conductive member of the electrode member will vary, and correspondingly, results in the changes of the capacitance of the capacitor.

In practice, a sensor of the above described types may be subjected to overloads which exceed the pressure measuring range of the sensor. Since these overloads may damage or destroy the sensing diaphragm, it is necessary to provide a mechanism to protect the sensing diaphragm when overloaded. One of conventional methods is to increase the thickness of the sensing diaphragm. Another general method is to use stronger material to make the diaphragm. Increasing the thickness or using stronger material often decreases motion of the diaphragm, and correspondingly decreases the sensitivity of the sensor.

It is an object of the present invention to provide an improved sensor having an overload protection mechanism.

It is another object of the present invention to provide an improved sensor with high sensitivity, and is relatively inexpensive and easy to manufacture.

SUMMARY OF THE INVENTION

The present invention is an improved capacitance sensor, adapted for high accuracy measurement of pressure having an overload protection mechanism. The sensor includes an elastic member, preferably a diaphragm, a plate or a beam. The elastic member disposed about a central axis of the sensor, and has a central region, a peripheral region, a first side, and a second side. The sensor comprises a support member supporting the peripheral region or edges of the elastic member. A post-extends from the central region of the elastic member along the central axis.

The sensor further includes an overpressure stop member fixedly coupled to (and supporting) the peripheral region of the elastic member or the support member. The overpressure stop member extends over the elastic member except for an aperture disposed about the central axis. The overpressure stop member has an inner surface facing the elastic member and an outer surface facing away from the overpressure stop member. In one preferred embodiment, the overpressure stop member is electrically conductive or has an electrically conductive portion on its outer surface.

The sensor further includes a first plate rigidly coupled (directly or indirectly) to the outer surface of the overpressure stop member. In one preferred embodiment, the first plate defines an aperture above the aperture defined by the overpressure stop member. The apertures are sized to allow passage of the post which extends therethrough. The first plate has a first surface, preferably facing away from the elastic member, comprising a first electrically conductive region.

The sensor further comprises a second plate extending from the post transverse to the central axis. The second plate has a second electrically conductive region opposite the first electrically conductive region of the first surface of the first plate. The opposite electrically conductive regions are electrically insulated from each other.

In one preferred form, the overpressure stop member and the first plate form an integral structure wherein the outer surface of the overpressure stop member and the first surface of the first plate are coincident. In another preferred form, the first plate is rigidly mounted to the outer surface of the overpressure stop member. In yet another preferred embodiment, the first plate and the overpressure stop member are discrete and spaced apart, both being rigidly coupled to the support member.

The post extends downwardly from a first end which is connected to the central region of the elastic member to a second end. The second plate extends radially and outwardly from the second end of the post. The first plate and the second plate are preferably substantially parallel, which there respective electrically conductive regions being oppositely each other.

The capacitive sensor may further include an electrically conductive path extending from the post via the elastic member to the first electrically conductive region of the first surface of the first plate. The second electrically conductive region of the first side of the second plate is electrically insulated from that path. In a preferred embodiment, the elastic member, the overpressure stop member, the first plate and the post are conductive, for example, all of them are made from metal, or where one or more of those elements is non-conductive, have an electrically conductive layers disposed thereon to form the electrically conductive path.

In one preferred embodiment, the inner surface of the overpressure stop member has a contour adapted to limit deflection of the elastic member caused by a differential pressure, or force, across the elastic member. Preferably, the contour defined by the inner surface of the overpressure stop member substantially conforms to a desired contour for by the elastic member short of its limits of elastic deformation, when the elastic member is deflected to the limiting contour defined by the overpressure stop member, the inner surface of the overpressure stop member can fully and uniformly supports the central region of the elastic member when the elastic member is overloaded.

The differential pressure can derive from a constant, controlled environment pressure being in contact with the first side of the elastic member and a pressure to be measured being in contact with the second side of the elastic member. The force can be a proof load or a burst load.

In a preferred embodiment, an electrode assembly is electrically connected to the first and second electrically conductive regions. That electrode assembly is adapted to indicate the pressure differential, or the force resulting in corresponding changes in capacitance. By way of example, where the electrodes of the sensor are coupled across a fixed inductor to form an oscillator, the frequency of the oscillator varies with the pressure-differential or force induced changes in capacitance of the sensor, and thus is representative of the pressure differential or force.

In one preferred embodiment, the elastic member further has a boss, preferably rigid, which is integral with, or affixed to, the elastic member in the central region, i.e., disposed about the central axis. The boss may be designed as a first point of contact with the overpressure stop member to minimize stresses over the elastic central region when the elastic member is overloaded.

BRIEF DESCRIPTION OF THE DRAWINGS

The foregoing and other objects of this invention, the various features thereof, as well as the invention itself, may be more fully understood from the following description, when read together with the accompanying drawings in which.

DETAILED DESCRIPTION OF THE PREFERRED EMBODIMENTS

Figure 1:
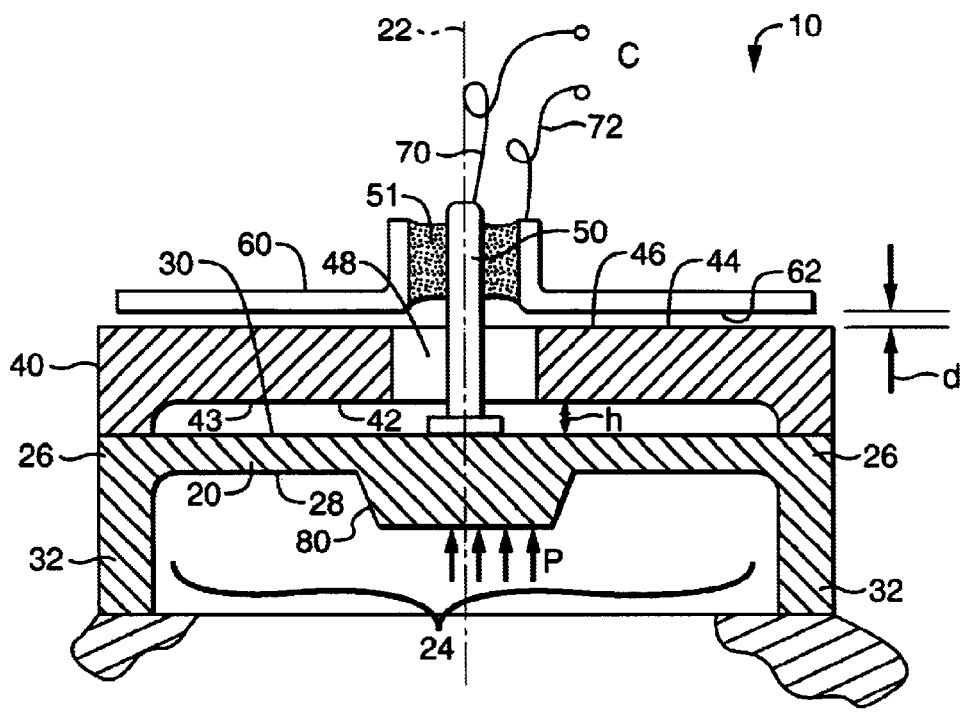
FIG. 1 shows a cross sectional view of one embodiment of a sensor in accordance with the present invention.

FIG. 1 shows a capacitive sensor 10 in accordance with the present invention. The capacitive sensor 10 includes an elastic member 20, disposed about a central axis 22. The elastic member 20 could be a diaphragm, a plate, or a beam. The elastic member 20 includes a central region 24, a peripheral region 26, a first side 28, and a second side 30.

The elastic member 20 is planar (FIGS. 1–3) or concave/convex (FIGS. 4–5) when unloaded, and is elastically deformable. A support member 32 is fixedly coupled to the peripheral region 26 of the elastic member 20. The elastic member 20, in one form of the invention, is a relatively thin deformable diaphragm stretching across to the peripheral region 26, and preferably is made of steel, and most preferably stainless steel, but could be made from other materials such as another metal, ceramic or glass. In one preferred form (as illustrated in FIGS. 1–3), a central portion of the central region 24 is relatively thick to form a rigid block and other portion of the central region 24 is thin and deformable. In another preferred embodiment, elastic member 20 has a boss 80, preferably rigid, integral or attached to the central region 24 of the elastic member 20, disposed about the central axis 22.

Figure 3A:
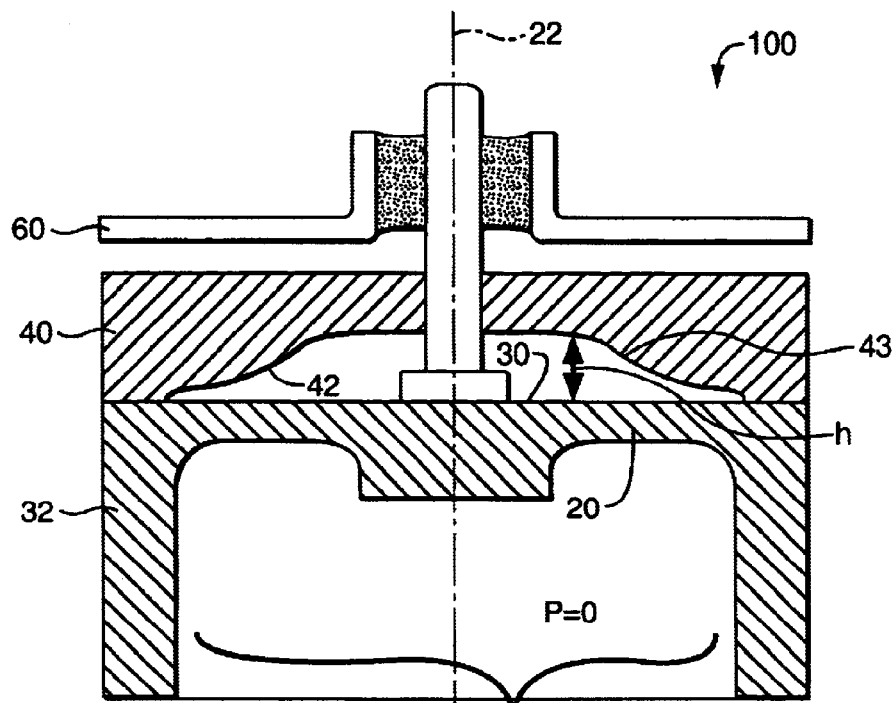
FIG. 3A shows a cross-sectional view of an alternate embodiment of the sensor in accordance with the present invention.
Figure 3B:
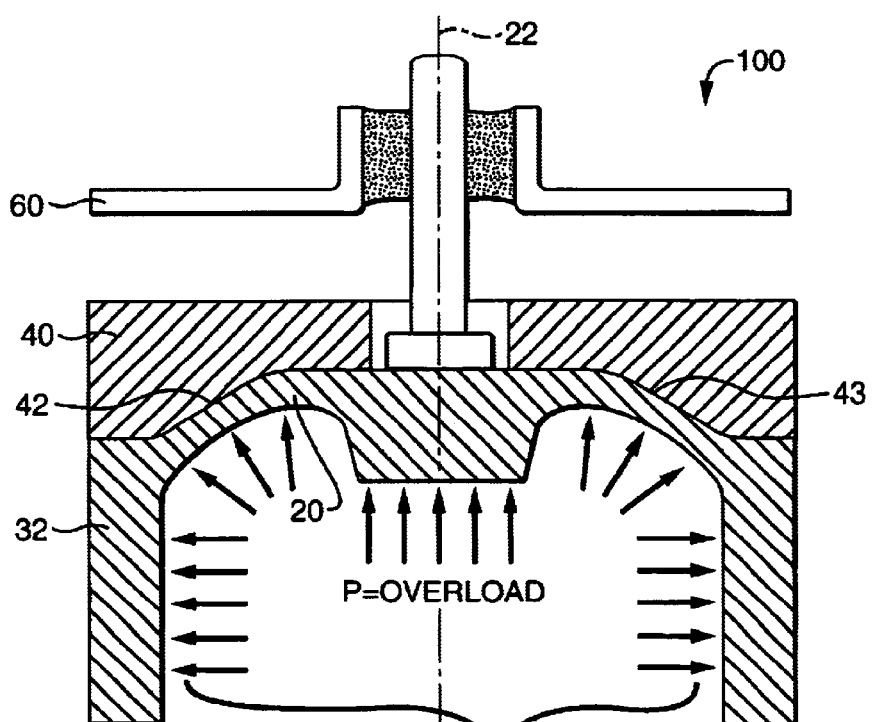
FIG. 3B shows a cross-sectional view of the sensor of FIG. 3A when overloaded.

As shown in FIG. 1, an overpressure stop member 40 is fixedly coupled to the second side 30 of the peripheral region 26 of the elastic member 20, by welding, brazing, soldering or other suitable method of joining. The overpressure stop member 40 includes an inner surface 42 and an outer surface 44. In one preferred form, the outer surface 44 is substantially planar. As shown in FIG. 1, the entire inner surface 42 of the overpressure stop member faces the second side 30 of the elastic member 20 and is nominally (with no differential pressure load) spaced apart from the second side 30 by a uniform predetermined distance, h. In another preferred embodiment, the central portion only of the inner surface 42 of the overpressure stop member 40 is spaced apart from the central region 24 of the elastic member 20 by a predetermined distance. In another preferred embodiment of the present invention, such as shown in FIGS. 3A–3B, the inner surface 42 of the overpressure stop member defines a support contour 43 which substantially conforms to a configuration defined by the central region 24 of the elastic member 20 when the central region 24 deflected to a predetermined extent.

Figure 1A:
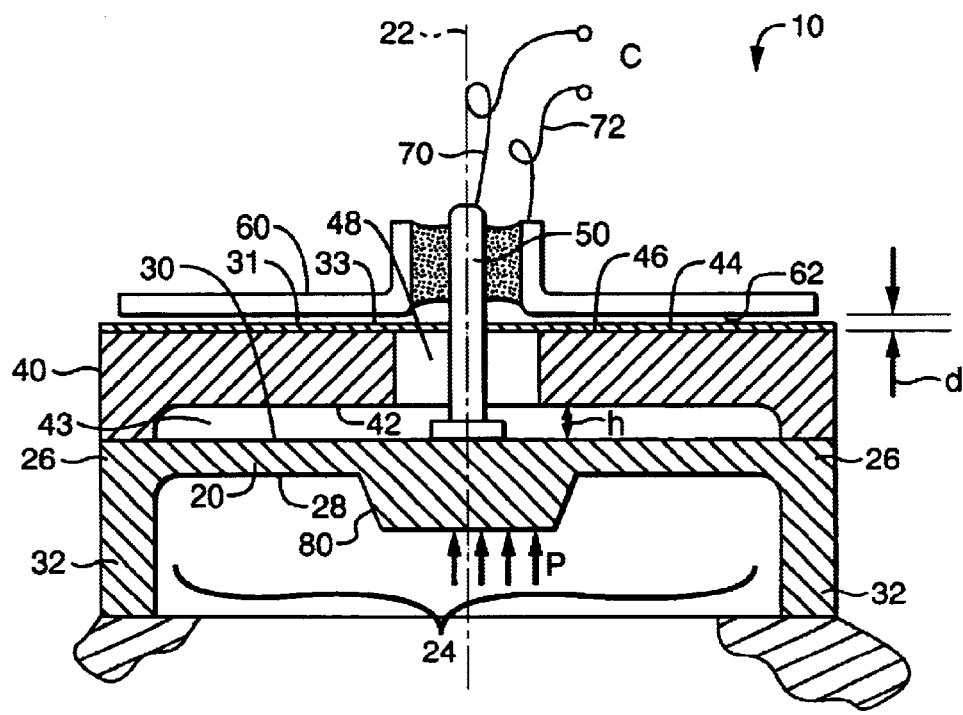
FIG. 1A shows a cross-sectional view of another embodiment of the present invention.

The capacitive sensor 10 further comprises a first plate 31 which includes a first surface 33 having a first electrically conductive region 46 thereon. In one preferred form, as shown in FIG. 1, the overpressure stop member 40 and the first plate 31 form an integral structure, wherein the outer surface 44 of the overpressure stop member 40 and the first surface 33 of the first plate 31 are coincident. In another preferred form, as shown in FIG. 1A, the first plate 31 is rigidly coupled to the support member 32.

A second plate 60 is disposed transverse to the central axis 22, being nominally (under no load) spaced apart from the first surface 33 of the first plate 31 by a predetermined distance, d, and being substantially parallel to the first surface 33 of the first plate 31. While in the preferred embodiment, the parallel opposed surfaces are planar, they may have other shapes in other embodiments, such as concave/convex or convex/concave. In the illustrated embodiments, the second plate 60 is connected to the central region 24 of the elastic member 20 by a rigid post 50, which is adapted for transferring displacement along axis 22 of the central region 24 of the elastic member 20, preferably, the displacement of a central point of the central region 24, to movement of the second plate 60 along the central axis 22. In one preferred form, as shown in FIG. 1, the overpressure stop member 40 and the first plate 31 define a central aperture region 48 about the central axis 22, and the post 50 extends from the central point of the elastic member 20 through the central aperture region 48 to the second plate 60. The second plate 60 includes a second electrically conductive region 62 opposite the first electrically conductive region 46 of the first plate 31. The first electrically conductive region 46 of the first plate 31 and the second electrically conductive region 62 of the second plate 60 form a parallel plate capacitor (although in other forms of the invention, plates of the capacitor may be non-parallel). The capacitor has a characteristic capacitance which varies inversely with the distance d (which value is related to the pressure differential or force across the central region 24 of the elastic member 20).

In the preferred form of the invention illustrated in FIGS. 1–3, the elastic member 20, support 32, post 50, first plate 31 and overpressure stop member support 40 are metal, and thus are electrically conductive. The second plate 60 includes an annular metal (electrically conductive portion) mechanically coupled to, but electrically insulated from, post 50, preferably by a glass coupling 51. In other forms of the invention, the various elements may be constructed of non-conductive material (such as glass, plastic or ceramic), but with electrically conductive layers or plating on the various elements to create a similar electrical structure.

In one preferred embodiment, an electrically conductive path is provided from an electrode 70, via the post 50, elastic member 20, overpressure stop member 40, and first plate 31, to the first electrically conductive region 46. In an alternative form, the electrode 70 may be directly connected to the first electrically conductive region 46. Another electrode 72 is connected to the second electrically conductive region 62. The electrodes 70, 72 are used to indicate the changes in capacitance caused by relative motion of the regions 46 and 62 due to pressure differential induced motion of the central region 24 of the elastic member 20.

Figure 2A:
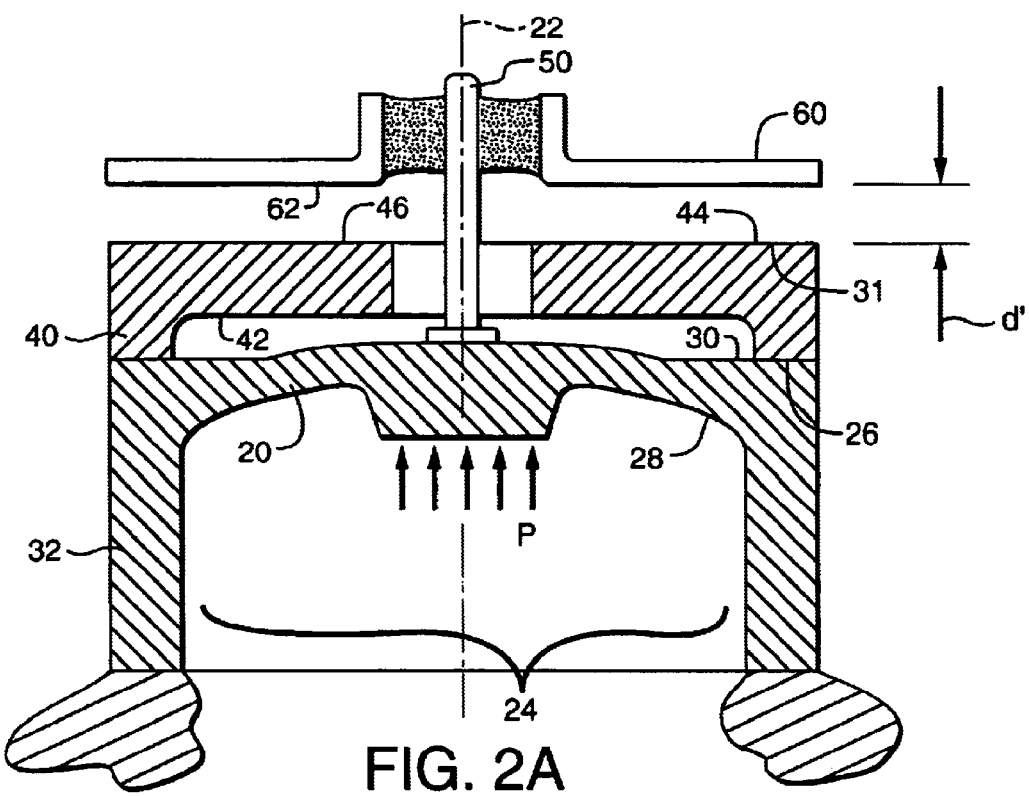
FIG. 2A shows a cross-sectional view of the sensor of FIG. 1 when load is within normal operating range.
Figure 2B:
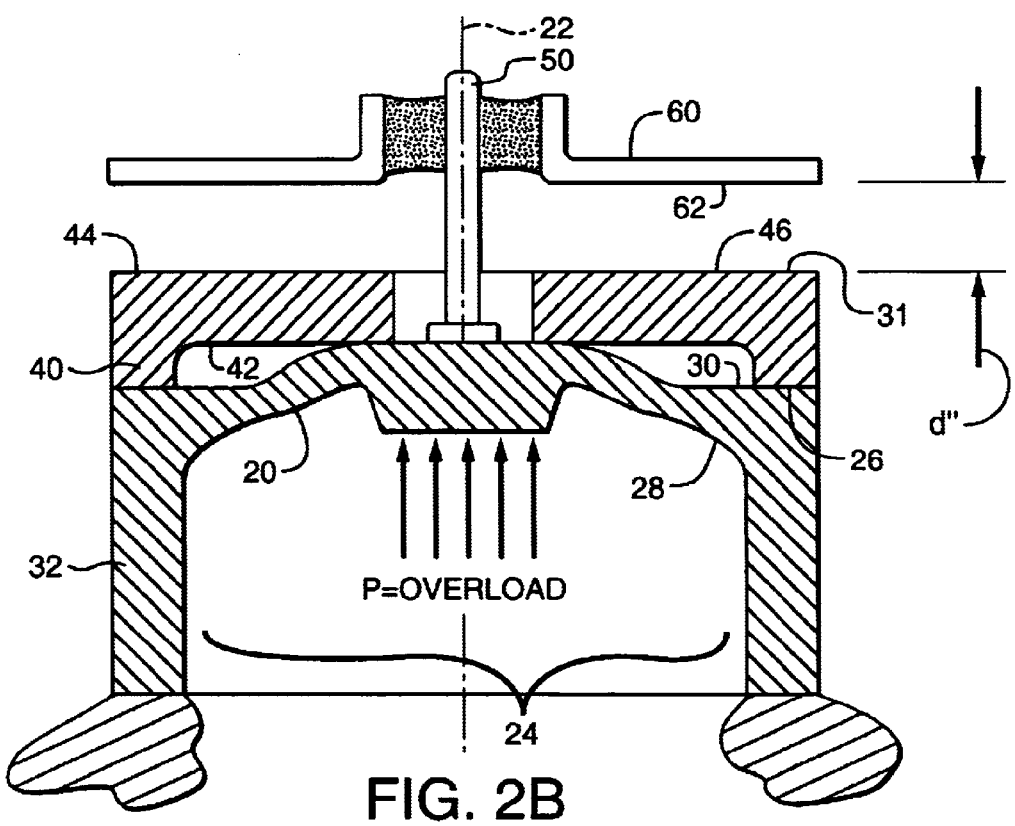
FIG. 2B shows a cross-sectional view of the sensor of FIG. 1 when overloaded.

As shown in FIGS. 2A and 2B, the relative pressure P (or force) which is to be measured is applied to the first side 28 of the elastic member 20 and a controlled pressure, in one form, the normal air pressure, is applied to the second side 30 of the elastic member 20. The pressure differential (or force) across the elastic member 20 causes displacement of the central point of the elastic member 20. This pressure differential (or force) induced displacement of the central point results in corresponding variations in the distance d between the first capacitor plate 31 and the second capacitor plate 60, and correspondingly, results in the changes of the capacitance of the capacitor. The electrode assembly generates signals to indicate the value of the pressure P (or force) in response to the changes of the capacitance of the capacitor. When the pressure P (or force) equals to the maximum load which the deformable central region 24 is expected to stand, the central region 24 is deflected to the extent to touch the inner surface 42 of the overpressure stop member 40, and when the pressure P (or force) exceeds the maximum range of the sensor 10, as shown in FIG. 2B, the displacement of the central region 24 of the elastic member 20 is stopped by the inner surface 42 of the overpressure stop member 40, preventing the central region 24 from further stretching. Thereby, the overpressure stop member 40 protects the elastic member 20 from damage by overload pressure or force.

FIGS. 3A and 3B illustrate an alternate embodiment of the sensor 100. As shown in FIGS. 3A and 3B, the sensor 100 includes an overpressure stop member 40 which defines a support contour 43 adapted to limit deflection of the elastic member 20 caused by differential pressure between the two regions across the elastic member. The support contour 43 is preferably defined to substantially conform to the central region 24 of the elastic member 20 when the central region 24 is deflected to a predetermined extent, for example, to the maximum stretch which the elastic member is expected to stand. As shown in FIG. 3B, when the sensor 100 is overloaded, the support contour 43 fully and uniformly supports the central region 24 and prevents the elastic member 20 from being over stretched.

Figure 4:
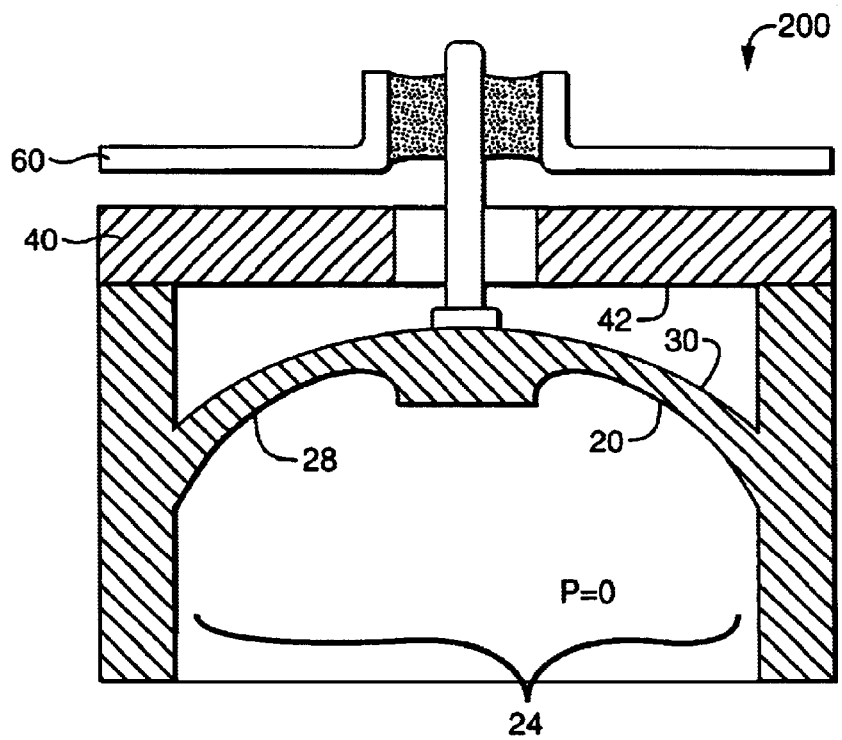
FIG. 4 shows a sectional view of a second alternate embodiment of the sensor in accordance with the present invention.

FIG. 4 illustrates a sensor 200 according to another preferred embodiment of the present invention. As shown in FIG. 4, the central region 24 of the elastic member 20 is curved or dome-shaped when the central region 24 is in an unloaded state. The dome-shaped design of the central region 24 gives greater central motion for a given stress level. In a preferred form, the inner surface 42 of the overpressure stop member 40 is substantially planar.

Figure 5:
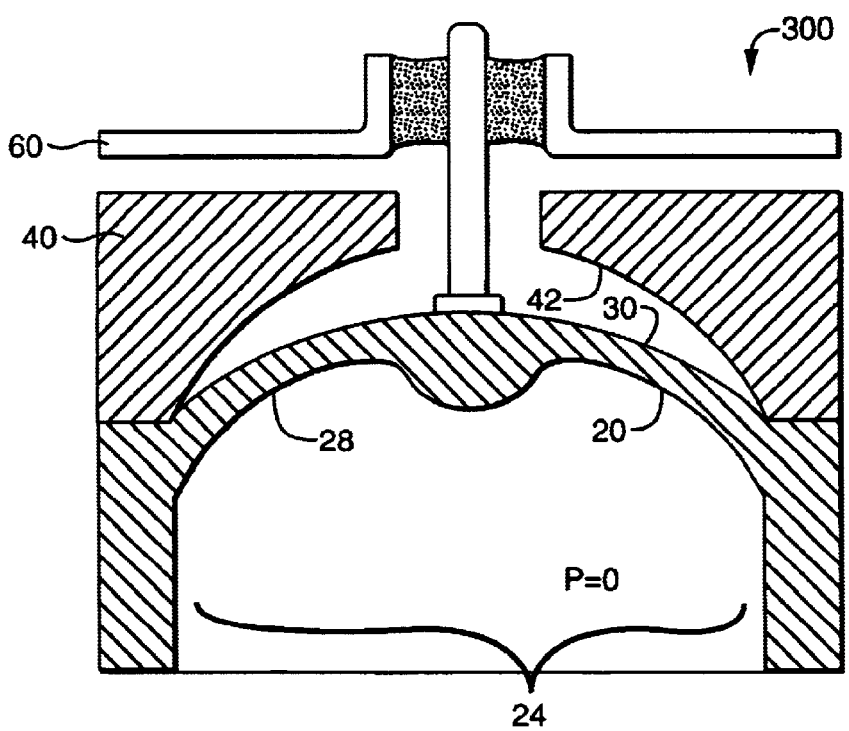
FIG. 5 shows a cross-sectional view of a third alternate embodiment of the sensor in accordance with the present invention.

FIG. 5 illustrates another sensor 300 according to another preferred embodiment of the present invention. As shown in FIG. 5, the central region 24 of the elastic member 20 is curved or dome-shaped when the central region 24 is in an unloaded state. The inner surface 42 of the overpressure stop member 40 is concave, and preferably contoured to fully support the elastic member 20 when the sensor 300 is overloaded.

Figure 6:
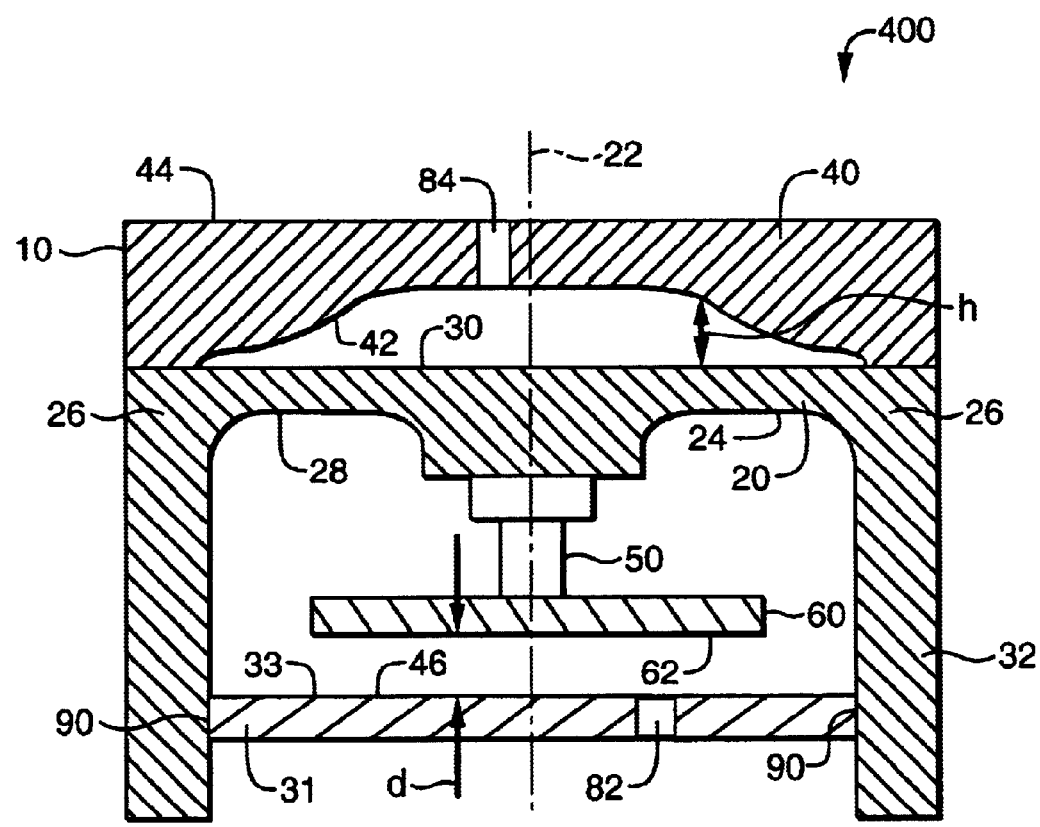
FIG. 6 shows a cross-sectional view of a fourth alternate embodiment of the sensor in accordance with the present invention.

FIG. 6 illustrates another sensor 400 according to another preferred embodiment of the present invention. As shown in FIG. 6, an elastic member 20 is disposed about a central axis 22 of the sensor. The elastic member 20 includes a central region 24, a peripheral region 26, a first side 28, and a second side 30. A support member 32 supports the peripheral region of the elastic member 20. An overpressure stop member 40 is rigidly coupled to the support member 32. The overpressure stop member 40 extends over the elastic member 20, and having an inner surface 42 and outer surface 44. A rigid first plate 31 is rigidly coupled to the support member 32, and having a first surface 33 including a first electrically conductive region 46 thereon. A post 50 is affixed to and extending from the elastic member 20 along the central axis 22. A second plate 60 extends from the post 50 transverse to the central axis 22. The second plate 60 having a second electrically conductive region 62 opposite the first electrically conductive region 46 of the first surface 33 of the first plate 31. The opposite electrically conductive regions 46 and 62 are electrically insulated from each other. For example, the first plate 31 may be connected to the support member 32 by an insulation material 90. A differential pressure is establishable across the elastic member 20 by way of ports 82 and 84. In use, the differential pressure across elastic member 20 causes motion of plate 60 relative to plate 31, resulting in a change in gap d, and capacitance.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of the equivalency of the claims are therefore intended to be embraced therein.

What is claimed is:

1. A capacitive sensor comprising:
   A. an elastic member disposed about a central axis of said sensor, said elastic member having a central region, a peripheral region, a first side, and a second side;
   B. a support member supporting the peripheral region of said elastic member;
   C. an overpressure stop member rigidly coupled to said support member, said overpressure stop member extending over said elastic member except for an aperture region, and having an inner surface and outer surface, said inner surface facing said elastic member;
   D. a first plate rigidly coupled to said support member and extending over said elastic member except for an aperture region, and having a first surface including a first electrically conductive region thereon;
   E. a post affixed to and extending from said second side of said elastic member along said central axis, said post passing through said aperture regions; and
   F. a second plate extending from said post transverse to said central axis, said second plate having a second electrically conductive region opposite said first electrically conductive region of said first surface of said first plate, wherein said opposite electrically conductive regions are electrically insulated from each other.

2. A capacitive sensor according to claim 1 further comprising a boss extending from said central region of said elastic member along said central axis.

3. A sensor according to claim 1, wherein said overpressure stop member and said first plate form an integral structure wherein said outer surface of said overpressure stop member and said first surface of said first plate are coincident.

4. A sensor according to claim 1, wherein said capacitive sensor further comprises an electrically conductive path being provided from a first electrode, via said post, said elastic member, said overpressure stop member, and said first plate, to said first electrically conductive region, a second electrode being connected to said second electrically conductive region, said first and second electrodes being used to indicate the changes in capacitance caused by relative motion of said first and second electrically conductive regions due to pressure differential induced motion of said elastic member.

5. A sensor according to claim 1, wherein said inner surface of said overpressure stop member has a contour adapted to limit deflection of said central region of said elastic member caused by a differential pressure across said elastic member.

6. A capacitive sensor according to claim 1, wherein said inner surface of said overpressure stop member defines a support contour which substantially conforms to a configuration defined by said elastic member when said elastic member deflected to a predetermined extent.

7. A sensor according to claim 1, wherein said pressure differential derives from a pressure being in contact with said first side of said elastic member and a constant, controlled environment being in contact with said second side of said elastic member.

8. A capacitive sensor according to claim 1, wherein said elastic member is an elastic diaphragm.

9. A capacitive sensor according to claim 1, wherein said elastic member is an elastic plate.

10. A capacitive sensor according to claim 1, wherein said elastic member is an elastic beam.

11. A capacitive sensor according to claim 1, wherein said elastic member is made from a material selected from a group of steel, stainless steel, ceramic and glass.

12. A capacitive sensor according to claim 1, wherein said overpressure stop member is made of a substantially rigid material.

13. A capacitive sensor according to claim 1, wherein said elastic member is substantially flat.

14. A capacitive sensor according to claim 1, wherein said elastic member is dome-shaped.

15. A capacitive sensor according to claim 1, wherein said inner surface of said overpressure stop member is substantially planar.

16. A capacitive sensor according to claim 1, wherein said inner surface of said overpressure stop member is concave.

17. A capacitive sensor according to claim 16, wherein said inner surface of said overpressure stop member is contoured such that said inner surface of said overpressure stop member fully and uniformly supports said elastic member when said elastic member deflected to a predetermined extent.

18. A capacitive sensor according to claim 1, wherein said outer surface of said overpressure stop member is substantially planar.

19. A sensor according to claim 1, wherein said capacitive sensor further comprises an electrode assembly including a first electrode electrically coupled to said first electrically coupled region, and a second electrode electrically coupled to said second electrically conductive region.

20. A capacitive sensor comprising:
   A. an elastic member extending about a central axis, said elastic member having a central region, a peripheral region, a first side, and a second side;
   B. a support member supporting the peripheral region of said elastic member;
   C. an overpressure stop member coupled to said peripheral region of said elastic member, said overpressure stop member having an inner surface and an outer surface, said inner surface of said overpressure stop member facing said second side of said elastic member and being spaced apart from said central region of said elastic member by a predetermined distance;
   D. a first plate coupled to said support member, said first plate having a first surface comprising a first electrically conductive region thereon; and
   E. a second plate spaced apart from and being substantially parallel to said first plate, said second plate being connected to said central region of said elastic member by a post, wherein said post transfers deformation of said central region of said elastic member caused by differential pressure across said elastic member to movement of said second plate along said central axis, said second plate having a second electrically conductive region opposite said first electrically conductive region, wherein said first electrically conductive region and said second electrically conductive region form a capacitor.

21. A capacitive sensor according to claim 20 further comprising an electrode assembly being electrically connected to said first electrically conductive region and said second electrically conductive region, said electrode assembly being adapted for indicating pressure differential derived from a pressure being in contact with said first side of said elastic member and a constant, controlled environment pressure being in contact with said second side of said elastic member.

22. A capacitive sensor according to claim 20, wherein said post is connected to a central point of said elastic member and is adapted for transferring the deformation of said central point to the movement of said second plate.

23. A capacitive sensor according to claim 20 further comprising an electrically conductive path extending from said post to said first electrically conductive region, said electrically conductive path being insulated from said second electrically conductive region.

24. A capacitive sensor according to claim 20, wherein said overpressure stop member and said first plate form an integral structure wherein said outer surface of said overpressure stop member and said first surface of said first plate are coincident.

25. A capacitive sensor according to claim 24, wherein said overpressure stop member defines an aperture region disposed about said central axis, and wherein said post passing through said aperture region, said post having a first end connected to the central region of said elastic member and a second end connected to said second plate, said post being adapted for transferring the deformation of said central region to the movement of said second plate.

26. A capacitive sensor according to claim 20, wherein said first plate is mounted to said outer surface of said overpressure stop member.

27. A capacitive sensor according to claim 26, wherein said first plate and said overpressure stop member define an aperture region disposed about said central axis, and wherein said post passing through said aperture region, said post having a first end connected to the central region of said elastic member and a second end connected to said second plate, said post being adapted for transferring the deformation of said central region to the movement of said second plate.

28. A capacitive sensor according to claim 20, wherein said elastic member is an elastic diaphragm.

29. A capacitive sensor according to claim 20, wherein said elastic member is an elastic plate.

30. A capacitive sensor according to claim 20, wherein said elastic member is an elastic beam.

31. A capacitive sensor according to claim 20, wherein said elastic member is made from a material selected from a group of steel, stainless steel, ceramic and glass.

32. A capacitive sensor according to claim 20, wherein said overpressure stop member is made of a substantially rigid material.

33. A capacitive sensor according to claim 20, wherein said elastic member is substantially flat.

34. A capacitive sensor according to claim 20, wherein said elastic member is dome-shaped.

35. A capacitive sensor according to claim 20, wherein said inner surface of said overpressure stop member is substantially planar.

36. A capacitive sensor according to claim 20, wherein said inner surface of said overpressure stop member is concave.

37. A capacitive sensor according to claim 36, wherein said inner surface of said overpressure stop member is contoured such that said inner surface of said overpressure stop member fully and uniformly supports said central region when said central region deflected to a predetermined extent.

38. A capacitive sensor according to claim 20 further comprising a boss extending from said central region along said central axis.

39. A sensor according to claim 20, wherein said inner surface of said overpressure stop member has a contour adapted to limit deflection of said central region of said elastic member caused by a differential pressure across said elastic member.

40. A capacitive sensor according to claim 20, wherein said inner surface of said overpressure stop member defines a support contour which substantially conforms to a configuration defined by said elastic member when said elastic member deflected to a predetermined extent.

41. A sensor according to claim 20, wherein said pressure differential derives from a pressure being in contact with said first side of said elastic member and a constant, controlled environment being in contact with said second side of said elastic member.

* * * * *